(12) United States Patent
Lee et al.

(10) Patent No.: US 9,996,460 B2
(45) Date of Patent: Jun. 12, 2018

(54) STORAGE DEVICE, SYSTEM INCLUDING STORAGE DEVICE AND METHOD OF OPERATING THE SAME

(71) Applicant: SAMSUNG ELECTRONICS CO., LTD., Suwon-si (KR)

(72) Inventors: Donghun Lee, Daegu (KR); Moonsang Kwon, Seoul (KR); HyungJin Im, Hwaseong (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 15/147,337

(22) Filed: May 5, 2016

(65) Prior Publication Data

US 2017/0031816 A1 Feb. 2, 2017

(30) Foreign Application Priority Data

Jul. 31, 2015 (KR) .......................... 10-2015-0108868

(51) Int. Cl.
 *G06F 12/02* (2006.01)
 *G06N 99/00* (2010.01)

(52) U.S. Cl.
 CPC ...... *G06F 12/0253* (2013.01); *G06F 12/0246* (2013.01); *G06N 99/005* (2013.01); *G06F 2212/7205* (2013.01)

(58) Field of Classification Search
 CPC ............ G06F 12/0253; G06F 12/0246; G06F 2212/7205; G06F 12/02; G06N 99/005
 USPC ........................................................ 711/103
 See application file for complete search history.

(56) References Cited

U.S. PATENT DOCUMENTS

| | | | |
|---|---|---|---|
| 6,910,213 | B1 | 6/2005 | Hirono et al. |
| 7,110,917 | B2 * | 9/2006 | Matsuura .............. G06F 11/008 358/1.14 |
| 8,356,061 | B2 | 1/2013 | Vengerov |
| 8,713,268 | B2 | 4/2014 | Dillow et al. |
| 8,874,872 | B2 | 10/2014 | Feldman et al. |
| 8,880,775 | B2 | 11/2014 | Stefanus et al. |
| 9,430,154 | B2 * | 8/2016 | Cohen ..................... G11C 29/52 |
| 9,703,500 | B2 * | 7/2017 | Fiske ..................... G06F 3/0625 |
| 2010/0287217 | A1 | 11/2010 | Borchers et al. |
| 2013/0282954 | A1 | 10/2013 | Sankar et al. |
| 2013/0290598 | A1 * | 10/2013 | Fiske ..................... G06F 3/0625 711/103 |

(Continued)

FOREIGN PATENT DOCUMENTS

JP 2002-297443 A 10/2002
JP 2006-172495 A 6/2006

*Primary Examiner* — Pierre Miche Bataille
(74) *Attorney, Agent, or Firm* — Sughrue Mion, PLLC

(57) ABSTRACT

A method of operating a storage device according to an exemplary embodiment includes receiving a first target value and a second target value of a plurality of target values respectively corresponding to a first operating parameter and a second operating parameter of a plurality of target values of operating parameters from a host, loading a first existing value and a second existing value of a plurality of existing values of the first operating parameter and the second operating parameter, processing a machine learning algorithm using the first target value, the second target value, the first existing value and the second existing value to generate an adaptive schedule, and executing the background operation based on the schedule.

20 Claims, 21 Drawing Sheets

(56) References Cited

U.S. PATENT DOCUMENTS

| | | |
|---|---|---|
| 2014/0075105 A1 | 3/2014 | Colgrove et al. |
| 2014/0189196 A1* | 7/2014 | Kelkar .................... G06F 12/16 |
| | | 711/102 |
| 2014/0281127 A1 | 9/2014 | Marcu et al. |
| 2014/0281338 A1 | 9/2014 | Choi et al. |

* cited by examiner

FIG. 4

| OPERATING PARAMETERS | EXISTING VALUES | TARGET VALUES | WEIGHTS |
|---|---|---|---|
| Free Block Count | 20 k | 40 k | w_1 |
| Wear Level | 300 | 1k | w_2 |
| Temperature | 65℃ | 55℃ | w_3 |
| ⋮ | ⋮ | ⋮ | ⋮ |
| Rate of Operation | 83% | 90% | w_i |
| Error Correction Cost | 2us | 2us | w_i+1 |
| ⋮ | ⋮ | ⋮ | ⋮ |
| Read IOPS | 600 MB | 800 MB | w_j |
| Write IOPS | 500 MB | 500 MB | w_j+1 |
| Load Level | 14% | 10% | w_j+2 |
| ⋮ | ⋮ | ⋮ | ⋮ |
| Estimated Idle Time | 7 sec | 5 sec | w_k |
| Estimated I/O Pressure | 50% | 60% | w_k+1 |
| ⋮ | ⋮ | ⋮ | ⋮ |

F_existing    F_target    W

P1 { P1_1 {Free Block Count, Wear Level, Temperature}, P1_2 {Rate of Operation, Error Correction Cost} }

P2 { P2_1 {Read IOPS, Write IOPS, Load Level}, P2_2 {Estimated Idle Time, Estimated I/O Pressure} }

STORAGE DEVICE, SYSTEM INCLUDING STORAGE DEVICE AND METHOD OF OPERATING THE SAME

CROSS-REFERENCE TO RELATED APPLICATION

This application claims priority from Korean Patent Application No. 10-2015-0108868, filed on Jul. 31, 2015, in the Korean Intellectual Property Office, the disclosure of which is incorporated herein by reference in its entirety.

BACKGROUND

Apparatuses and methods consistent with exemplary embodiments relate to storage devices, and methods of operating the same.

In a variety of systems, storage devices are used for storing data. Various storage devices may have different sizes, storage capacities, operating speeds, and host connection methods. An SSD (solid state drive or solid disk device) is an example of a storage device based on a nonvolatile semiconductor memory device, such as a flash memory, and has been used in a variety of applications.

SUMMARY

Aspects of exemplary embodiments provide a storage device adaptively scheduling a timing of a background operation of the storage device, a system including the storage device, and a method of operating the same.

According to an aspect of an exemplary embodiment, there is provided a method of operating a storage device in communication with a host, the method including: receiving a first target value and a second target value of a plurality of target values respectively corresponding to a first operating parameter and a second operating parameter of a plurality of operating parameters of the storage device from the host; loading a first existing value and a second existing value of a plurality of existing values of the first operating parameter and the second operating parameter; processing a machine learning algorithm using the first target value, the second target value, the first existing value and the second existing value to generate an adaptive schedule; adaptively scheduling a background operation of the storage device based on the generated adaptive schedule; and executing the background operation based on the adaptive scheduling of the background operation.

The first operating parameter may correspond to a state of the storage device, and the loading of existing values of the operating parameters may include measuring or calculating the state of the storage device.

The first operating parameter may include at least one among a number of free blocks of the storage device, a wear level index, a temperature, a rate of internal operation, and an error correction time.

The second operating parameter may correspond to a state of the host, and the loading of existing values of the operating parameters may include receiving the second operating parameter from the host.

The second operating parameter may include at least one among an input/output throughput, an input/output latency, a load index, an estimated idle time, and an estimated input/output usage.

The machine learning algorithm may be a Q-learning algorithm.

The method may further include: calculating a performance score proportional to an absolute value of the difference between the target values and the existing values using the Q-learning algorithm; and determining a timing label corresponding to a row comprising the highest Q value in a table comprised of rows of combinations of the operating parameters and columns of timing information of the background operation, and the adaptive scheduling of the background operation may be based on the determined timing label.

The storage device may include a flash memory device, and the background operation may be a garbage collection operation corresponding to the flash memory device.

The machine learning algorithm may be processed using the first target value, the second target value, the first existing value, the second existing value, a first weight of the first operating parameter and a second weight of the second operating parameter.

According to an aspect of another exemplary embodiment, there is provided a method of managing a storage device by a host in communication with the storage device, the method including: setting a first target value and a second target value of a plurality of target values respectively corresponding to a first operating parameter and a second operating parameter of a plurality of operating parameters of the storage device; loading a first existing value and a second existing value of a plurality of existing values of the first operating parameter and the second operating parameter; processing a machine learning algorithm using the first target value, the second target value, the first existing value and the second existing value to generate an adaptive schedule; adaptively scheduling a background operation of the storage device based on the generated adaptive schedule; generating a control signal to control the storage device to execute the background operation based on the adaptive scheduling of the background operation; and transmitting the control signal to the storage device.

The setting the first target value may include: receiving target performance information corresponding to an operation of the storage device; and extracting a first target value of the first operating parameter from the target performance information.

The setting of the target values for the operating parameters may include generating the first target value based on one among an operation that is being performed, an operation that is to be performed in the host, or a prescribed reference value.

The first operating parameter may correspond to a state of the storage device, and the loading of the first existing value may include receiving the first operating parameter from the storage device.

The second operating parameter may correspond to a state of the host, and the loading of the second existing value may include measuring or calculating the second operating parameter.

The machine learning algorithm may be a Q-learning algorithm, and the method may further include: calculating a performance score proportional to an absolute value of the difference between the target values and the existing values using the Q-learning algorithm; and determining a timing label corresponding to a row comprising the highest Q value in a table comprised of rows of combinations of the operating parameters and columns of timing information of the background operation, and the adaptive scheduling of the background operation may be based on the determined timing label.

The storage device may include a flash memory device, and the background operation may be a garbage collection operation corresponding to the flash memory device.

The machine learning algorithm may be processed using the first target value, the second target value, the first existing value, the second existing value, a first weight of the first operating parameter and a second weight of the second operating parameter.

According to an aspect of still another exemplary embodiment, there is provided a storage device including: a nonvolatile memory; and a controller configured to: receive a first target value and a second target value of a plurality of target values respectively corresponding to a first operating parameter and a second operating parameter of a plurality of operating parameters of the storage device from a host; load a first existing value and a second existing value of a plurality of existing values of the first operating parameter and the second operating parameter; adaptively schedule a background operation of the nonvolatile memory based on the first target value, the second target value, the first existing value and the second existing value; and execute the background operation of the nonvolatile memory based on the adaptive scheduling of the background operation.

The first operating parameter may correspond to a state of the storage device, and the second operating parameter may correspond to a state of the host.

The adaptive scheduling may be based on a machine learning algorithm processed using the first target value, the second target value, the first existing value, the second existing value, a first weight of the first operating parameter and a second weight of the second operating parameter

BRIEF DESCRIPTION OF THE DRAWINGS

Exemplary embodiments will be more clearly understood from the following detailed description taken in conjunction with the accompanying drawings in which:

FIG. 4 is a table of operating parameters related to operation of a storage device according to an exemplary embodiment;

DETAILED DESCRIPTION OF EXEMPLARY EMBODIMENTS

Figure 1:
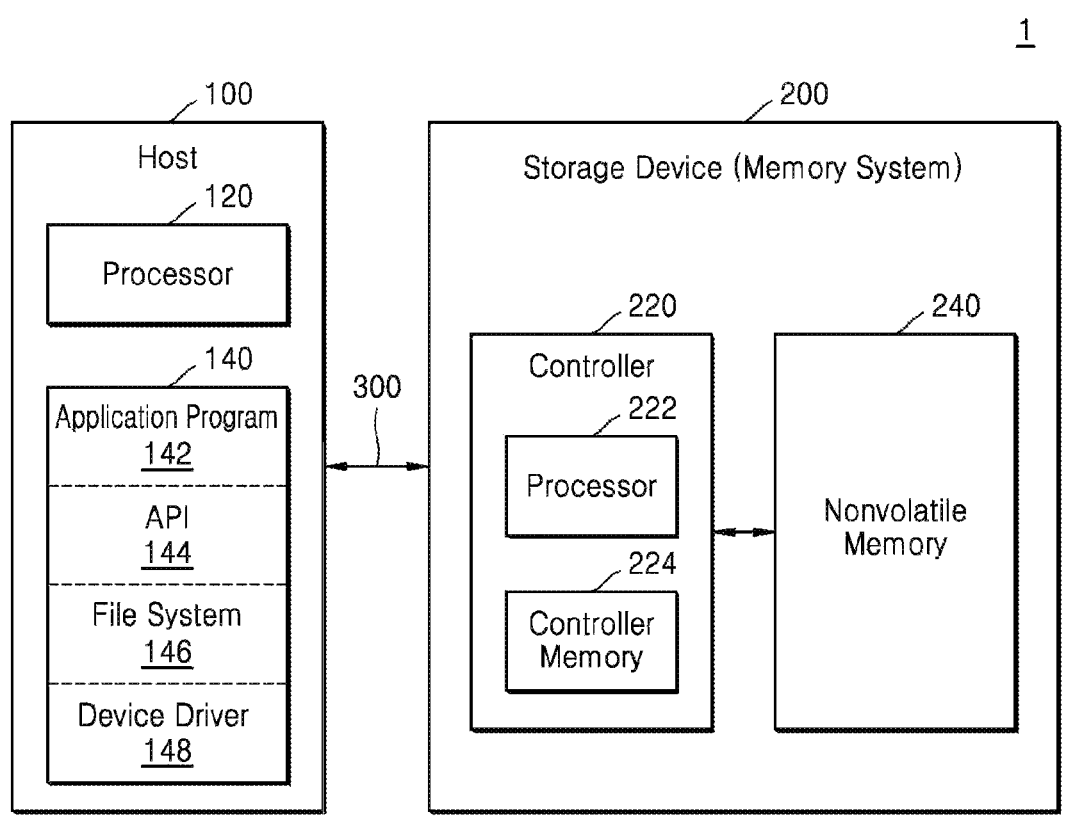
FIG. 1 is a block diagram of a system according to an exemplary embodiment.

Exemplary embodiments will now be described with reference to the accompanying drawings. These exemplary embodiments are provided so that this disclosure is thorough and complete, and fully conveys the scope of the inventive concept to one skilled in the art. Accordingly, while exemplary embodiments can be modified in various ways to take on various alternative forms, exemplary embodiments thereof are shown in the drawings and described in detail below as examples. There is no intent to limit the inventive concept to the forms disclosed. On the contrary, the inventive concept is to cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing exemplary embodiments only and is not intended to be limiting of the inventive concept. As used herein, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, it will be understood that, although the terms "first", "second", etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless explicitly so defined herein. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a system 1 according to an exemplary embodiment. The system 1 may include a host 100 and a storage device (or memory system) 200. The storage device 200 may be built in to a host 100 or removable from the host 100. For example, the storage device 200 may be a card or an SSD (solid state drive or solid disk device) connected to the host 100 via a connector. The host 100 may be a device processing data such as a personal computer (PC), a mobile phone, and a personal digital assistant (PDA).

Referring to FIG. 1, the host 100 may store (or write) data by transmitting the data via a communication channel 300, or may read the stored data from the storage device 200 by receiving the data via the communication channel 300. The communication channel 300 may support any one of a variety of interface protocols such as a universal serial bus (USB), an embedded multimedia card (eMMC), a peripheral component interconnect-express (PCI-E), a non-volatile memory-express (NVMe), a universal flash storage (UFS), an advanced technology attachment (ATA), a serial-ATA, a parallel-ATA, a small computer system interface (SCSI), an enhanced small device interface (ESDI), and integrated drive electronics (IDE).

Referring to FIG. 1, the host 100 may include a processor 120 and a host memory 140. The processor 120 may include, for example, a microprocessor, a microcontroller, an application specific integrated circuit (ASIC), or a field programmable gate array (FPGA). The processor 120 may access the host memory 140, and may process data or execute instructions stored in the host memory 140.

The host memory 140 may store an application program 142, an application programming interface (API) 144, a file system 146, and a device driver 148. The processor 120 may execute the application program 142 stored in the host memory 140. While storing or reading data in/from the storage device 200, the application program 142 may communicate with the file system 146 via the API 144. The file system 146 may be a software module executed in a processor and may manage files in the storage device 200. The file system 146 may manage clusters of data in a logical address space. The file system 146 may be a circuit, software, or a combination of the circuit and the software. The device driver 148 may translate instructions from the file system 146 to transmit data through the communication channel 300 between the host 100 and the storage device 200.

Various methods of managing the storage device 200, according to one or more exemplary embodiments, may be performed by executing instructions included in the application program 142, the API 144, the file system 146, or the device driver 148, by the processor 120. For example, the device driver 148 may include instructions by which the processor 120 may adaptively schedule a timing for performing a background operation of the storage device 200. A detailed description with reference to the method of managing the storage device 200 will be described below.

The storage device 200 may include a controller 220 and a nonvolatile memory 240. The nonvolatile memory 240 may include a memory cell array including a plurality of memory cells. According to an exemplary embodiment, the memory cell array may be a three-dimensional (3D) memory array. The 3D memory array may be monolithically formed on an active region arranged on a silicon substrate, and at least one physical level of cell transistors having circuits that are related to operations of memory cells may be formed on or in the substrate. The term "monolithically" may mean that layers of each level of the memory cell array are directly deposited on the layers of each underlying level of the memory cell array.

U.S. Pat. Nos. 7,679,133, 8,553,466, 8,654,587, 8,559,235, and 9,053,978, as well as U.S. Patent Application Publication No. 2011/0233648, which are detailed descriptions of configurations of a 3D memory array formed of a plurality of levels and word lines and/or bit lines are shared therebetween, are incorporated by reference in their entireties.

According to an exemplary embodiment, the 3D memory array may include vertical NAND strings arranged in a vertical direction so that at least one cell transistor may be located on another cell transistor, and the at least one cell transistor may include a charge trap layer. In other words, a plurality of cell transistors may be NAND flash memory cells with a 3D vertical structure, in which each NAND flash memory cell is a vertical NAND (VNAND) flash memory cell. Hereinafter, exemplary embodiments will be described in detail with reference to an example in which a plurality of cell transistors of a memory cell array are NAND flash memory cells. In another exemplary embodiment, the plurality of cell transistors may be NAND flash memory cells with a two-dimensional horizontal structure, in which the NAND is a planar NAND. However, exemplary embodiments are not limited thereto, and in another exemplary embodiment, the plurality of cell transistors may be resistance type memory cells such as resistive random access memory (RRAM), phase-change RAM (PRAM), or magnetic RAM (MRAM).

The controller 220 may include a processor 222 and a controller memory 224. The processor 222 may include a microprocessor, a microcontroller, an ASIC or an FPGA. The processor 222 may access the controller memory 224, and may process data or execute instructions stored in the controller memory 224.

The controller memory 224 may include a volatile memory, such as a random access memory (RAM), and a nonvolatile memory, such as a read only memory (ROM), or a flash memory, and the nonvolatile memory may store a plurality of instructions to be executed by the processor 222. Any operation of a method of operating the storage device 200 may be performed by executing instructions stored in the nonvolatile memory of the controller memory 224, by the processor 222.

The storage device 200 may perform a background operation. The background operation may be stopped if a request is received from the host 100 through the communication channel 300, and may be performed to respond to the request from the host. For example, a flash memory, as an example of the nonvolatile memory 240, may have different write and erase units. For example, a flash memory may erase data by block units formed of a plurality of pages while writing data by page units. Therefore, the flash memory may write data to an empty region when performing an overwrite operation of data, and a region having existing data may become invalid. A garbage collection operation, as the background operation, may generate a region in which data can be written, for example, a free block, by erasing the invalid region. The garbage collection operation may delay a response time of the storage device 200 for responding to the request of the host 100, and thus may deteriorate operating performance of the system 1.

The methods of managing and operating of the storage device 200 according to an exemplary embodiment may improve the response time of the storage device 200 and the operating performance of the system 1, by adaptively determining a timing for performing the background operation of the storage device 200, that is, by determining a start time and a duration, according to set target performance.

Figure 2:
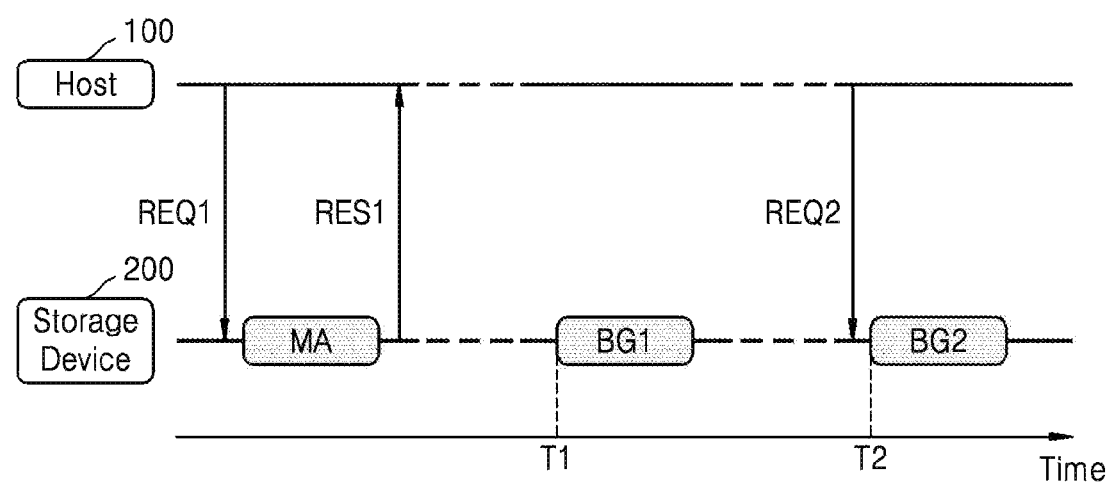
FIG. 2 is a view illustrating operations performed in a storage device according to one or more exemplary embodiments.

FIG. 2 is a view illustrating operations performed in a storage device, according to one or more exemplary embodiments. As described above, the host 100 may transmit a request to the storage device 200 and the storage device 200 may respond to the received request.

Referring to FIG. 2, the host 100 may transmit a first request REQ1 to the storage device 200, requesting access to the nonvolatile memory 240 of the storage device 200. For example, the first request REQ1 may include a write command, data, and an address, and the controller 220 of the storage device 200 may write the data to the nonvolatile memory 240 in response to the first request REQ1. In response to the first request REQ1, the storage device 200 may transmit a first response RES1 to the host 100. For example, the first response RES1 may indicate whether the operation according to the first request REQ1 of the host 100 has completed or failed.

The storage device 200 may perform a background operation at a point in time. As illustrated in FIG. 2, the storage device 200 may perform a first background operation BG1 at a time T1. For example, the controller 220 of the storage device 200 may perform the first background operation BG1 if a request is not received from the host 100 within a prescribed time period. The first background operation BG1 may be performed during a time period determined in advance by the controller 220 or until the storage device 200 receives a new request from the host 100.

The host 100 may transmit a request for instructing a background operation to the storage device 200. As illustrated in FIG. 2, the host 100 may transmit a second request REQ2 for requesting a background operation to the storage device 200, and the storage device 200 may perform a second background operation BG2 in response to the second request REQ2. For example, the second request REQ2 may include a code representing a type, a start time, and duration of a background operation.

According to an exemplary embodiment, the host 100 may adaptively schedule the background operation of the storage device 200 based on a machine learning algorithm, and may transmit a control signal (for example, the second request REQ2 of FIG. 2) for instructing the background operation to the storage device 200 according to the determined schedule. Furthermore, according to an exemplary embodiment, the storage device 200 may adaptively schedule the timing for the background operation based on the machine learning algorithm, and may perform the background operation according to the determined schedule. The machine learning algorithm may be an algorithm for adaptively learning a control method, such as, Q-learning, an artificial neural network, a Bayesian estimator, a support vector machine, or a Kalman filter. Hereinafter, although exemplary embodiments are described as using Q-learning as a machine learning algorithm, exemplary embodiments are not limited thereto.

Figure 3:
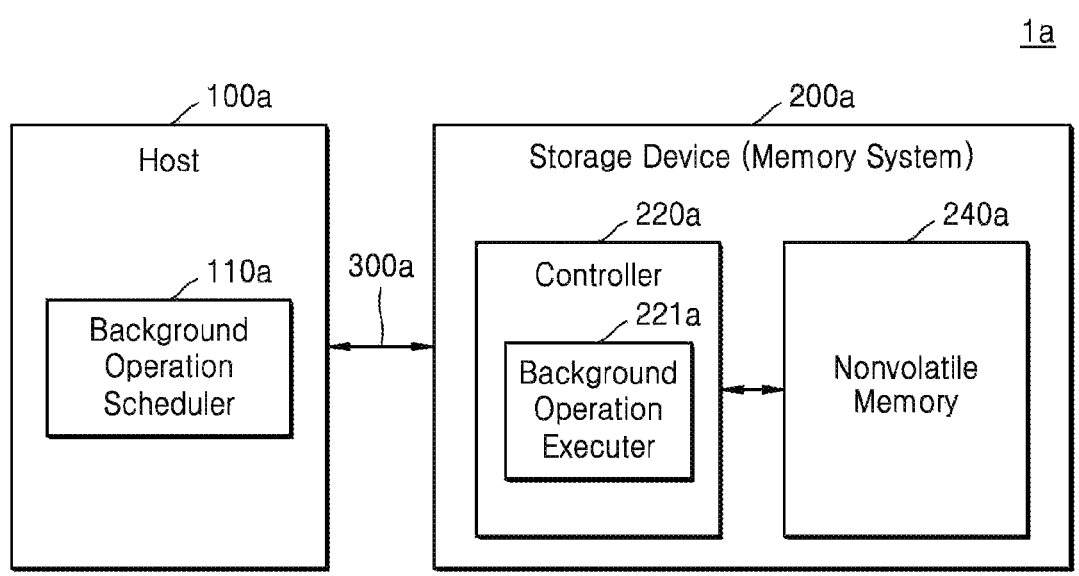
FIG. 3 is a block diagram of a system according to an exemplary embodiment.

FIG. 3 is a block diagram of a system 1a, according to an exemplary embodiment. The system 1a may include a host 100a and a storage device 200a, and the host 100a and the storage device 200a may communicate with each other through a communication channel 300a.

Referring to FIG. 3, the host 100a may include the background operation scheduler 110a. The background operation scheduler 110a may adaptively schedule a background operation of the storage device 200a. For example, the background operation scheduler 110a may perform a method of managing a storage device according to a flowchart of FIG. 5. In other words, the background operation scheduler 110a may set target values for operating parameters of the storage device 200a and may load existing values of the operating parameters. The background operation scheduler 110a may schedule the background operation, for example, based on a machine learning algorithm using the target values and the existing values of the operating parameters. Next, the background operation scheduler 110a may transmit a control signal (for example, the second request REQ2 of FIG. 2) for instructing the background operation to the storage device 200 through the communication channel 300a, according to the determined schedule. Referring to FIG. 1, the background operation scheduler 110a may be realized, for example, as the processor 120 and the host memory 140.

Referring to FIG. 3, the storage device 200a may include a controller 220a and a nonvolatile memory 240a, and the controller 220a may include a background operation executor 221a. The background operation executor 221a may execute a background operation (for example, a garbage collection operation) in response to the control signal (for example, the second request REQ2 of FIG. 2) received from the host 100a through the communication channel 300a. Furthermore, the background operation scheduler 110a of the host 100a may use the existing values of the operating parameters of the storage device 200a as a base for scheduling the background operation, and the background operation executor 221a may transmit the existing values to the host 100a through the communication channel 300a. The background operation executor 221a may be realized, for example, as the processor 222 and the controller memory 224 of FIG. 1.

FIG. 4 is a table of operating parameters related to an operation of a storage device according to an exemplary embodiment. In detail, FIG. 4 includes names of the operating parameters of the storage device, existing values, target values, and weights. As described above, the operating parameters may be used to schedule a background operation of the storage device. Hereinafter, FIG. 4 will be described with reference to FIG. 1.

As illustrated in FIG. 4, there may be two or more operating parameters related to an operation of the storage device 200, and the operating parameters may have a variety of values related to the operation of the storage device 200. For example, Free Block Count may indicate the number of free blocks included in the nonvolatile memory 240, and as the number of the free blocks increases, performance of the storage device 200 may improve. Furthermore, Read input/output operations per second (IOPS) may represent the speed at which data is read from the storage device 200, and as read IOPS increases, reading performance of the storage device 200 may improve.

As illustrated in FIG. 4, the operating parameters may include a first operating parameter set P1 and a second operating parameter set P2. The first operating parameter set P1 may include an operating parameter that is measured or calculated in the storage device 200, and the second operating parameter set P2 may include an operating parameter that is measured or calculated and corresponds to a state of the host 100.

The first operating parameter set P1 may include sub sets P1_1 and P1_2 respectively corresponding to information measured corresponding to a state of the storage device 200 and information calculated based on the measured information. For example, the sub set P1_1 may include a temperature measured by a temperature sensor included in the storage device 200, and the sub set P1_2 may include an operation rate calculated based on measured information, for example, the amount of data stored in a data buffer of the controller 220a, and an operation rate measured based on the type and number of commands stored in a command queue.

Furthermore, the second operating parameter set P2 may include sub sets P2_1 and P2_2 respectively corresponding to information measured corresponding to a state of the host 100 and information calculated based on the measured information. For example, the sub set P2_1 may include write IOPS measured by monitoring the communication channel 300, and the sub set P2_2 may include an estimated idle time calculated based on measured information, for example, the number of requests generated by the application program 142 stored in a queue, and an occupancy rate of the processor 120 of the application program 142, but is not limited thereto.

As illustrated in FIG. 4, each of the operating parameters may have an existing value, a target value, and a weight. The existing value of each operating parameter may correspond to a currently measured or calculated value of an operating parameter, and the target value of each operating parameter may correspond to a target value of an operating parameter derived from operating performance set by a user of the system 1 or the application program 142. Furthermore, the weight may indicate a contribution degree of each operating parameter to the operation of the storage device 200. As illustrated in FIG. 4, the existing value of each operating parameter may be represented by an existing value vector F_existing, the target value of each operating parameter may be represented by a target value vector F_target, and the weight of each operating parameter may be represented by a weight vector W.

Figure 5:
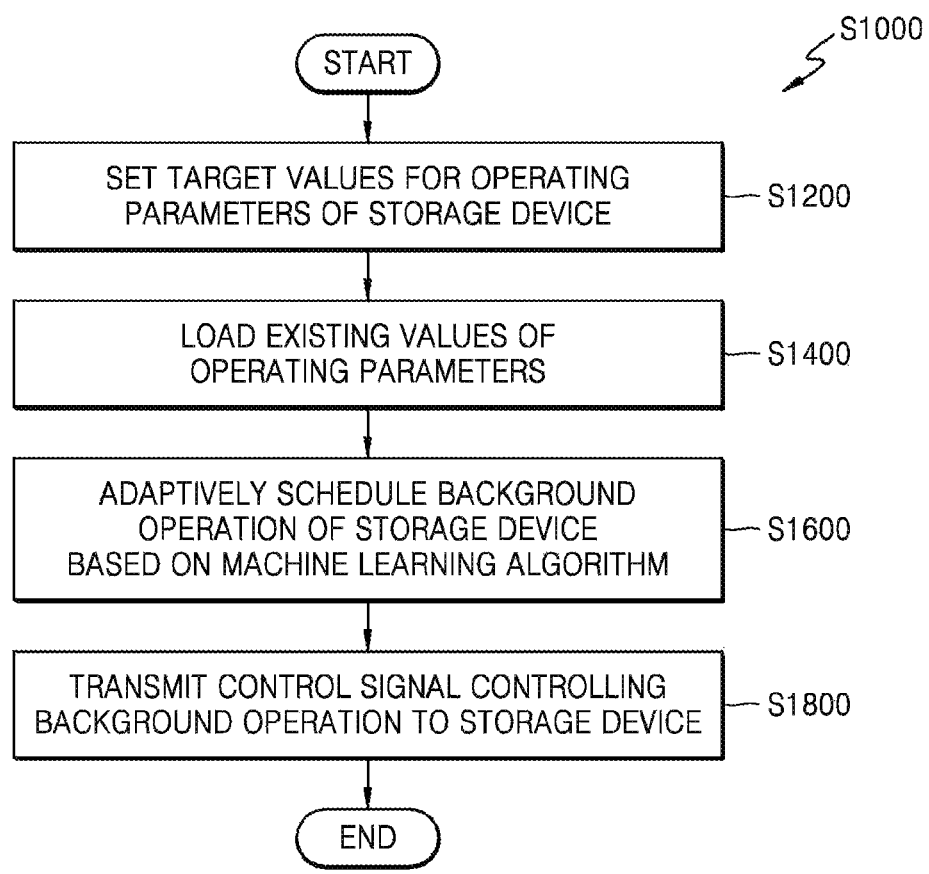
FIG. 5 is a flowchart illustrating a method of managing a storage device, according to an exemplary embodiment.

FIG. 5 is a flowchart illustrating a method of managing a storage device, according to an exemplary embodiment. In detail, FIG. 5 illustrates an exemplary embodiment of the management method S1000 in which a host manages the storage device. For example, the management method S1000 of FIG. 5 may be performed by the background operation scheduler 110a of FIG. 3. Hereinafter, the management method S1000 of FIG. 5 will be described with reference to FIG. 3. Referring to FIG. 5, the management method S1000 for managing the storage device 200a may include a plurality of operations S1200, S1400, S1600, and S1800.

In operation S1200, an operation of setting target values (for example, F_target in FIG. 4) for the operating parameters of the storage device 200a may be performed. Next, in operation S1400, an operation of loading existing values (for example, F_existing in FIG. 4) of the operating parameters may be performed.

In operation S1600, an operation of adaptively scheduling the background operation of the storage device 200a based on a machine learning algorithm may be performed. The machine learning algorithm may use the target values and the existing values of the operating parameters, and may adaptively find the optimum timing for the background operation based on a totaled values. Next, in operation S1800, an operation of transmitting a control signal (for example, REQ2 in FIG. 2) controlling the background operation to the storage device 200a may be performed. The control signal may include information indicating a point in time when the background operation starts and a period of performing the background operation. Hereinafter, detailed descriptions of each operation of FIG. 5 will be described with reference to FIGS. 6 through 13.

Figure 6:
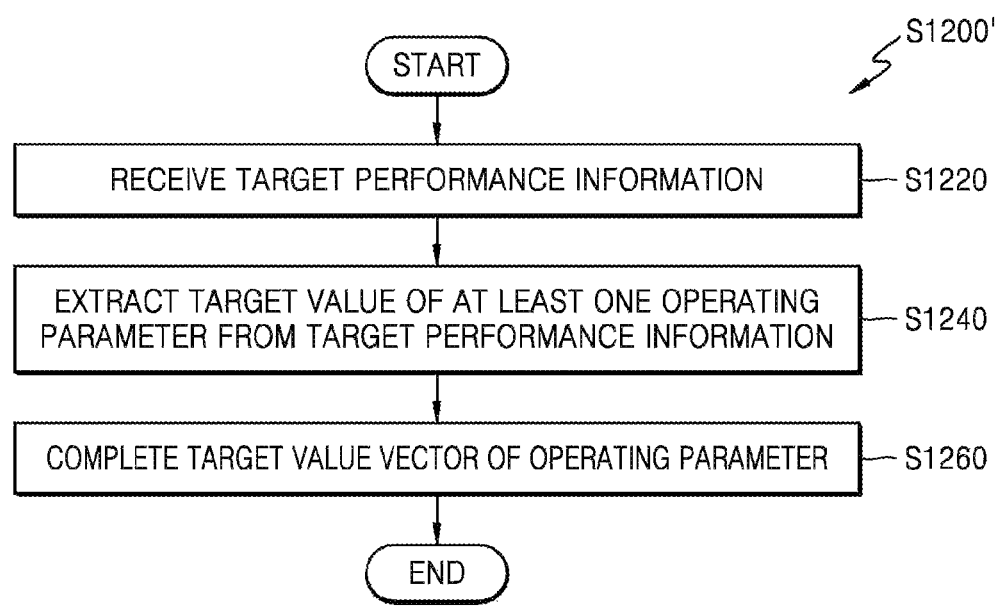
FIG. 6 is a flowchart illustrating a method of managing a storage device, according to an exemplary embodiment.
Figure 7:
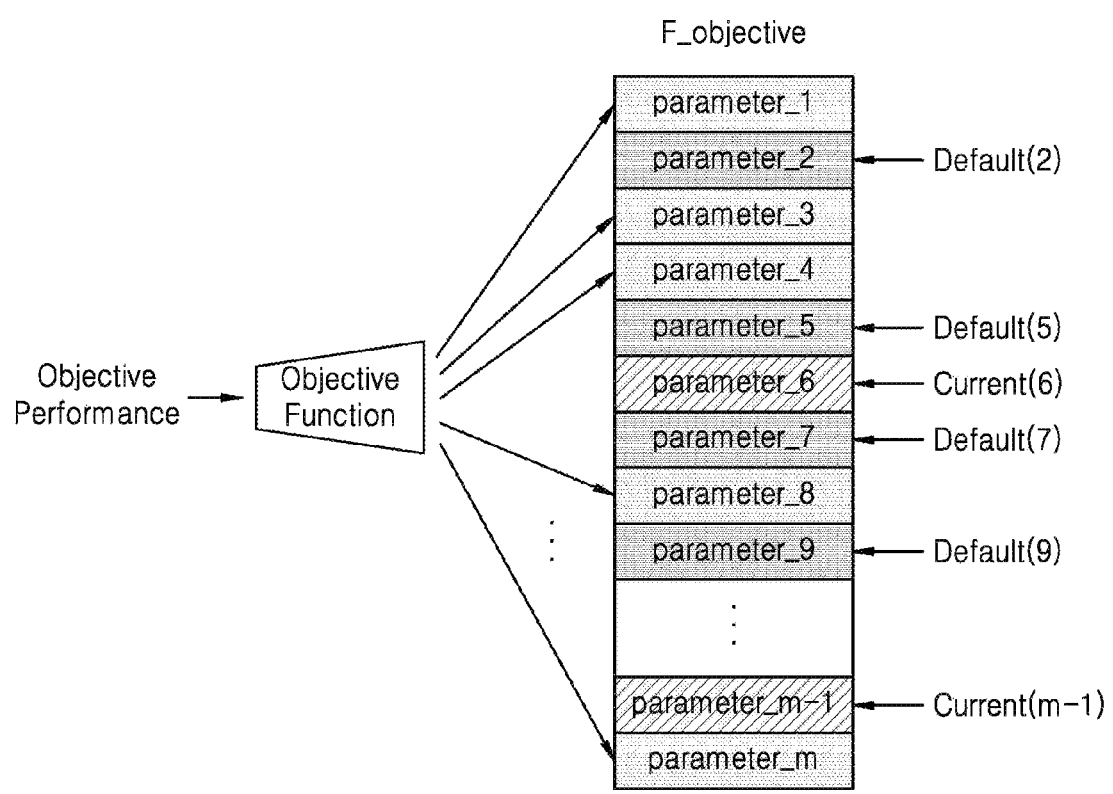
FIG. 7 is a view illustrating a process of generating a target value vector of an operating parameter, according to an exemplary embodiment.

FIG. 6 is a flowchart illustrating a method of managing a storage device, according to an exemplary embodiment, and FIG. 7 is a view illustrating a process of generating a target value vector of an operating parameter, according to an exemplary embodiment. As described above with reference to FIG. 5, the operation of setting target values for the operating parameters of the storage device 200a may be performed in operation S1200; therefore, the target value vector of the operating parameter may be generated. Referring to FIG. 6, operation S1200' may include operations S1220, S1240, and S1260.

In operation S1220, an operation of receiving target performance information may be performed. For example, the background operation scheduler 110a of FIG. 3 may receive the target performance information from a user of the host 100a (or system 1) through a user interface, from a software module executed in the host 100a of FIG. 3, such as an application program, or from a hardware module included in the host 100a. According to exemplary embodiments, the target performance information may include target values of the operating parameters of the storage device 200a of FIG. 3, or target performance of a higher level related to an operation for processing data of the storage device 200a. For example, the target performance information sent to the background operation scheduler 110a may include information indicating write completion time of data to be written to the storage device 200a. The write completion time of data may be set by an application program.

In operation S1240, an operation of extracting a target value of at least one operating parameter from the target performance information may be performed. When the target performance information received in operation S1220 includes the target value of the operating parameter, the background operation scheduler 110a may extract the target value. Furthermore, when the target performance information corresponds to the target performance of the higher level, as illustrated in FIG. 7, the background operation scheduler 110a may set the target values for the operating parameters to satisfy the defined target performance according to a target function to which the target performance is input. For example, when the target performance information includes information indicating write completion time of data to be written to the storage device 200a, the background operation scheduler 110a may set a target value for the write IOPS of FIG. 4 based on the size and the write completion time of the data to be written to the storage device 200a. Therefore, the target function makes it possible to adaptively schedule the background operation according to a desire of a user or an application program without providing specific control of the background operation to the user or the application program.

In operation S1260, an operation of completing the target value vector of the operating parameter may be performed. That is, as illustrated in FIG. 7, the operating parameter extracted from the target performance information by the background operation scheduler 110a of FIG. 3 in operation S1240 may be a part of the operating parameters illustrated in FIG. 4. Therefore, the background operation scheduler 110a may complete the target value vector (that is, F_target of FIG. 4) of the operating parameter by setting operating parameters that have not been extracted. Referring to FIG. 7, the background operation scheduler 110a may also set target values for some operating parameters (that is, parameter_2, parameter_5, parameter_7, and parameter_9) with reference to a default value. For example, an operating parameter corresponding to a temperature of the storage device 200a may be set to correspond to the maximum allowable temperature of the storage device 200a. Furthermore, the background operation scheduler 110a may set target values for some operating parameters (that is, parameter_6 and parameter_m−1) to existing values. As described below, background operation timing may be determined based on the difference between the target values and the existing values of the operating parameters, and therefore, an operating parameter having a target value and an existing value that are identical may temporarily not be used for determining the background operation timing.

Figure 8:
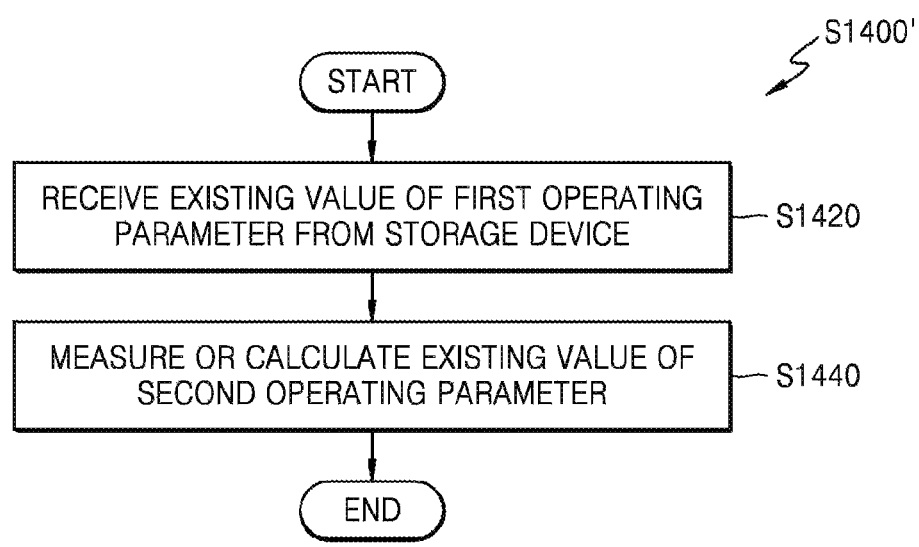
FIGS. 8-12 are flowcharts illustrating methods of managing a storage device, according to various exemplary embodiments.

FIG. 8 is a flowchart illustrating a method of managing a storage device, according to an exemplary embodiment. As described above with reference to FIG. 5, in operation S1400, an operation of loading existing values of operating parameters may be performed. Referring to FIG. 8, operation S1400' may include operations S1420 and S1440.

In operation S1420, an operation of receiving an existing value of a first operating parameter from the storage device 200a may be performed. The first operating parameter is an operating parameter included in the first operating parameter set P1 of FIG. 4, and the first operating parameter set P1 may include operating parameters that are measured or calculated and corresponds to a state of the storage device 200a as described above with reference to FIG. 4. The background operation scheduler 110a may receive existing values of the operating parameters included in the first operating parameter set P1 from the storage device 200a through the communication channel 300a.

In operation S1440, an operation of measuring or calculating an existing value of a second operating parameter may be performed. The second operating parameter is an operating parameter included in the second operating parameter set P2 of FIG. 4, and the second operating parameter set P2 may include operating parameters that are measured or calculated, and corresponds to a state of the host 100a as operating parameters related to the communication channel 300, as described above with reference to FIG. 4. The background operation scheduler 110a may measure or calculate existing values of the operating parameters included in the second operating parameter set P2.

Figure 9:
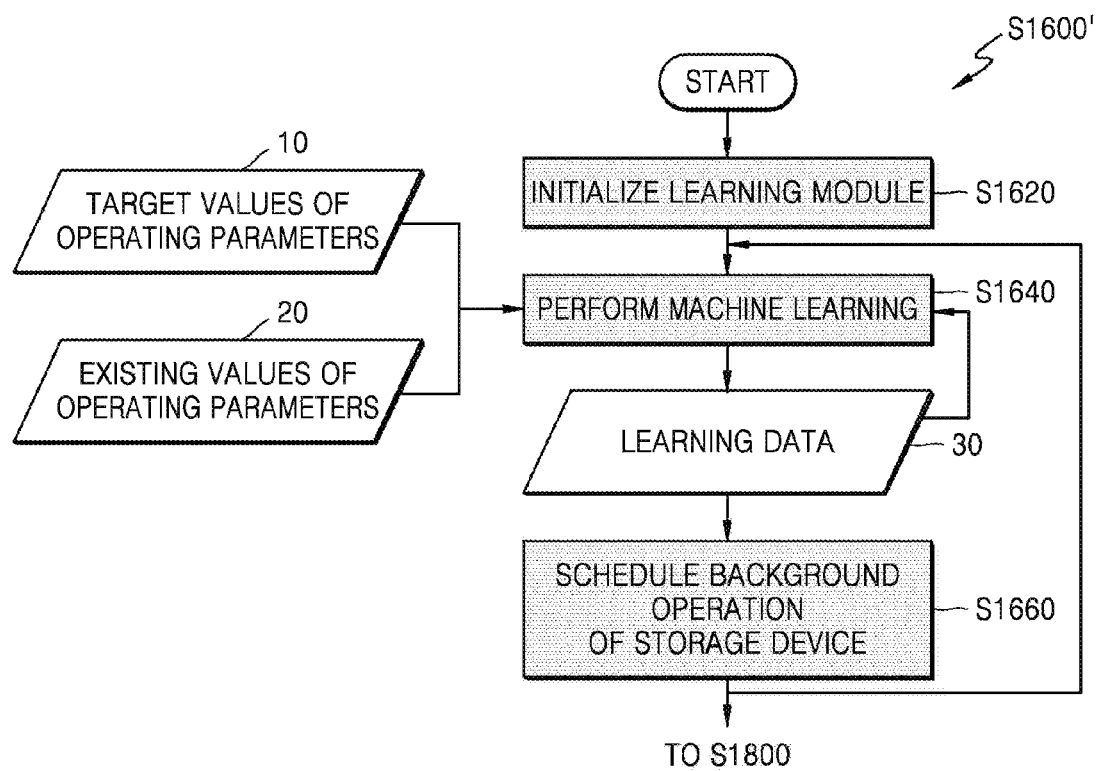

FIG. 9 is a flowchart illustrating a method of managing a storage device, according to an exemplary embodiment. As described above with reference to operation S1600 in FIG. 5, an operation of adaptively scheduling a background operation of a storage device based on a machine learning algorithm may be performed. Referring to FIG. 9, operation S1600' may include operations S1620, S1640, and S1660. Data 10 (for example, F_target of FIG. 4) including target values of operating parameters and data 20 (for example, F_existing of FIG. 4) including existing values of operating parameters may be used, and learning data 30 may be updated and reused.

In operation S1620, an operation of initializing a learning module may be performed. Operation S1620 may be performed, for example, when the storage device 200a is connected to the host 100a for the first time or when a power supply providing power to the storage device 200a (or the host 100a, the system 1) is turned on after being off. In other words, operation S1620 may be performed upon initialization of a machine learning operation, and the machine learning algorithm may accumulate data reflecting the target values and existing values of the operating parameters, and may determine a control method based on the accumulated data.

In operation S1640, the machine learning operation may be performed. As illustrated in FIG. 9, the machine learning may be performed based on the data 10 including the target values of the operating parameters, data 20 including the existing values of the operating parameters, and the learning data 30. Thus, the learning data 30 may be updated. The learning data 30 is fed back to operation S1640 and may be repeatedly used with the next iteration of the machine learning operation.

In operation S1660, an operation of scheduling the background operation of the storage device 200a may be performed. The learning data 30 may provide information corresponding to the optimum timing toward a target state represented by the target values of the operating parameters in a current state of the storage device 200a, according to the machine learning. The learning data 30 in operation S1660 may be analyzed to determine a scheduled time for performing the background operation. The method according to the present exemplary embodiment may proceed to operation S1800 of FIG. 5 following operation S1660.

Hereinafter, exemplary embodiments of operation S1600' of FIG. 9 will be described in detail with reference to FIGS. 10 to 13. Although the machine learning algorithm described below is embodied as Q-learning, the embodiment is exemplary, and it would be understood by one having ordinary skill in the art that exemplary embodiments are not limited thereto.

Figure 10:
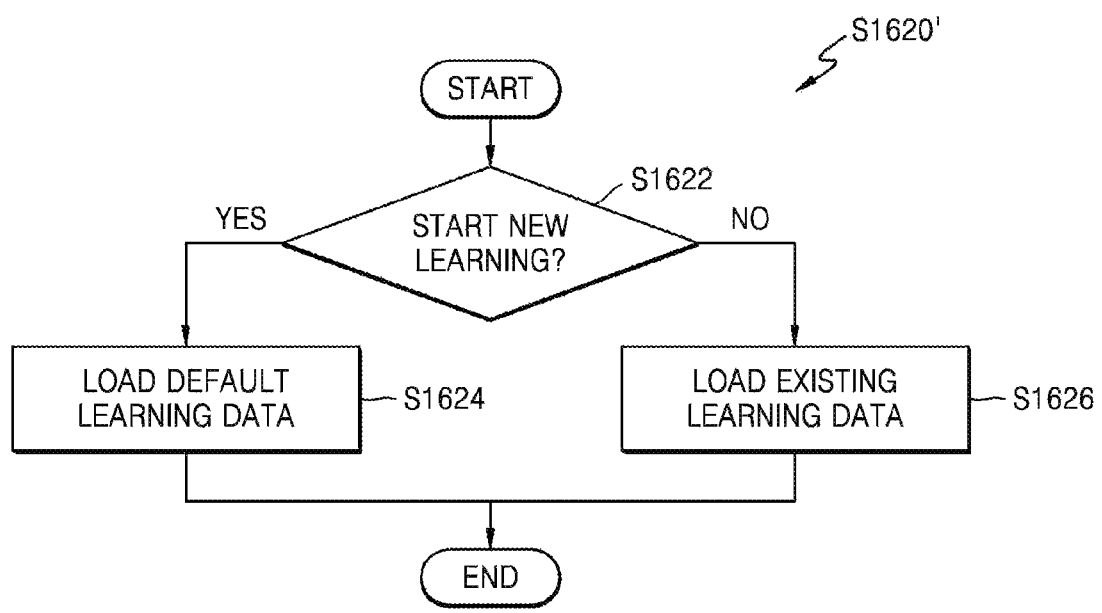

FIG. 10 is a flowchart illustrating a method of managing a storage device, according to an exemplary embodiment. As described above with reference to operation S1620 in FIG. 9, the learning module may be initialized, and the machine learning operation may begin. Referring to FIG. 10, operation S1620' may include operations S1622, S1624, and S1626.

In operation S1622, an operation of determining whether to initialize the machine learning operation may be performed. If operation S1622 determines that the machine learning operation is to be initialized, an operation of loading default learning data may be performed in operation S1624. Furthermore, if operation S1624 determines that the machine learning operation is not to be initialized, an operation of loading previous learning data may be performed in operation S1626.

When the communication channel 300a is formed between the host 100a and the storage device 200a, the background operation scheduler 110a may determine whether to start new learning. For example, when the storage device 200a is newly connected to the host 100a, the background operation scheduler 110a may load default learning data. When the storage device 200a has been previously deactivated by other components of the host 100a and is subsequently reactivated, the background operation scheduler 110a may load existing learning data.

Figure 11:
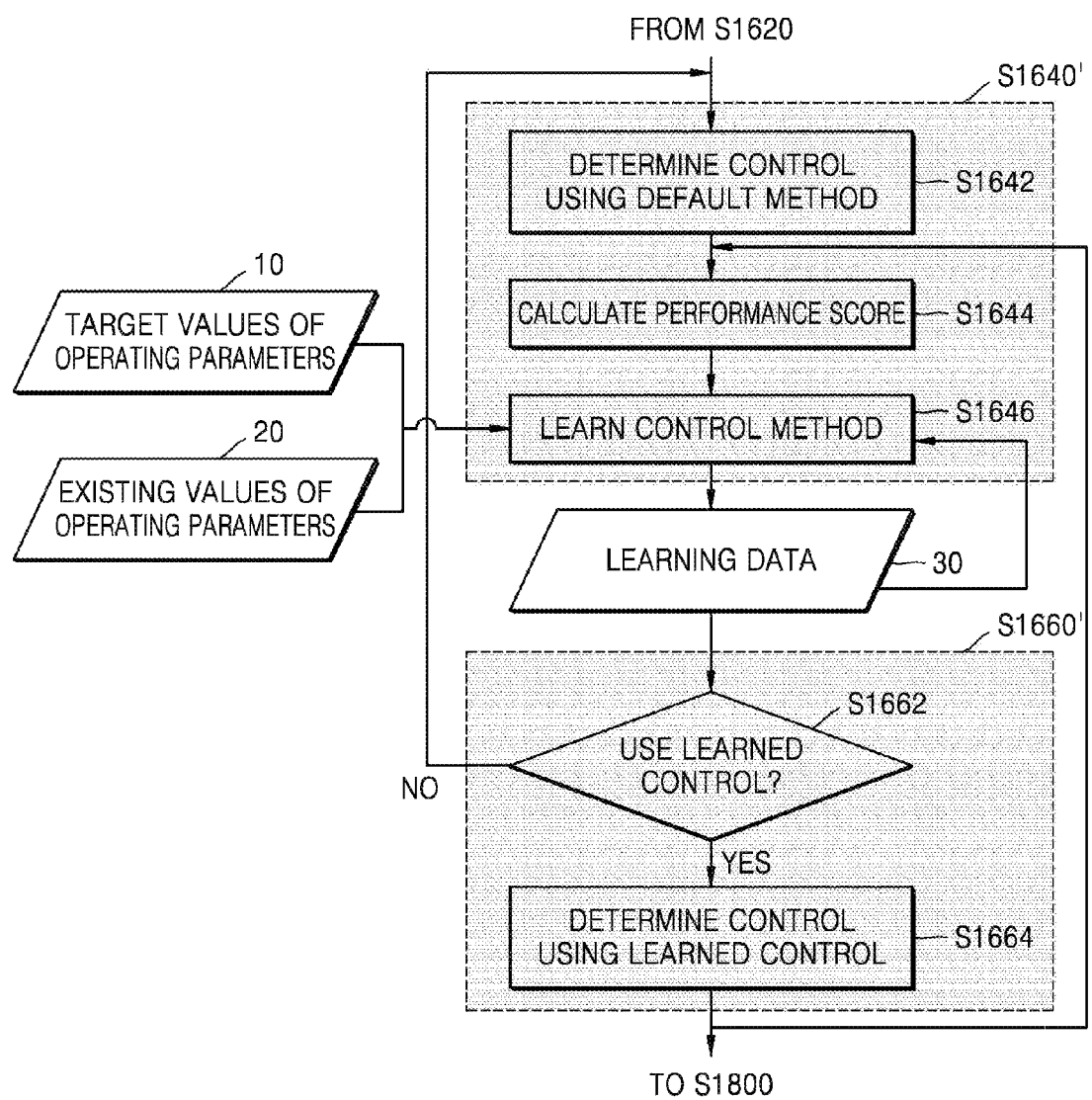
Figure 12:
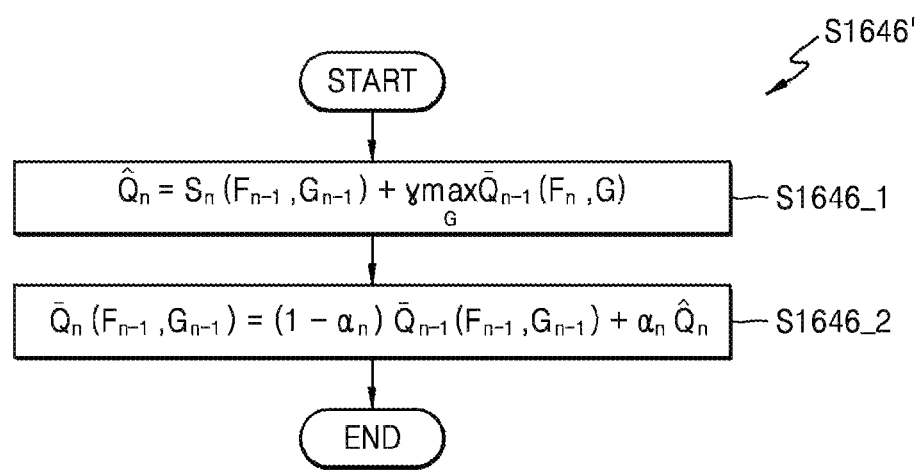
Figure 13:
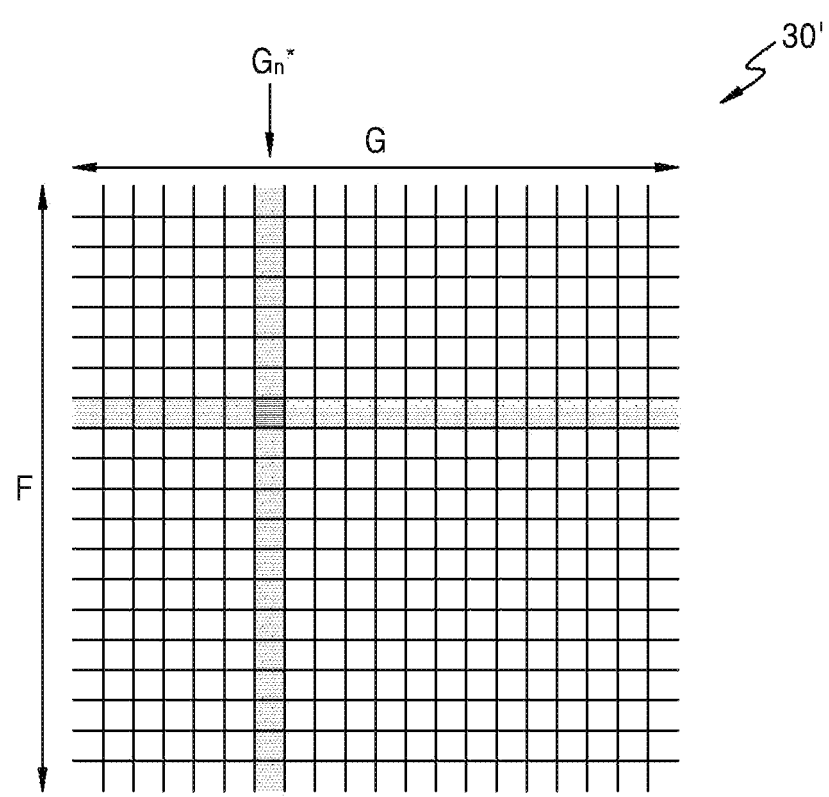
FIG. 13 is a view illustrating learning data and a method of managing a storage device, according to an exemplary embodiment.

FIGS. 11 and 12 are a flowcharts illustrating methods of managing a storage device, according to various exemplary embodiments, and FIG. 13 is a view illustrating learning data and a method of managing a storage device, according to an exemplary embodiment.

As described above with reference to FIG. 9, machine learning may be performed based on the data 10 including the target values of the operating parameters, data 20 including the existing values of the operating parameters, and the learning data 30. Thus, the learning data 30 may be updated. The learning data 30 may be used as a basis for scheduling a background operation. Referring to FIG. 11, operation S1640' may include operations S1642, S1644, and S1646 and operation S1660' may include operations S1662 and S1664.

Operation S1642 may determine a control using a default method. The control using a default method may be determined in operation S1642 when it is determined that a learning model is initialized by operation S1620 of FIG. 9, or a learned control is not used by operation S1662, as described below. For example, background operation timing may be scheduled in advance according to a plurality of conditions detectable according to a default method, and in operation S1642, the plurality of conditions may be detected according to the default method, and the background operation timing may be determined according to the detected conditions.

In operation S1644, an operation of calculating a performance score may be performed. The performance score may be represented by a reward. The performance score may be calculated based on the target value vector F_target that is the data 10 including the target values of the operating parameters, and the existing value vector F_existing that is the data 20 including the existing values of the operating parameters.

According to an exemplary embodiment, the performance score may be proportional to an absolute value of the difference between the target values of, and the existing values of the operating parameters. For example, the performance score $S_n(F, G)$ may be calculated according to Equation 1 below.

$$S_n(F,G)=W^T \cdot |F\_existing_n - F\_target| \qquad \text{[Equation 1]}$$

In Equation 1, F denotes combinations of the operating parameters, G denotes limited indexes corresponding to background operation timings. Furthermore, $W^T$ denotes a transposed matrix of the weight vector W of FIG. 4, and n denotes the number of iterations. A value of the weight vector W may be changed according to the iteration. For example, a priority level of each operating parameter may be determined according to target performance information received by the background operation scheduler 110a. Thus, a value of the weight vector W may be determined.

In operation S1646, an operation of learning a control method may be performed. The control method may be learned by a Q-value in a previous iteration (n−1), a learning rate, and a Q-value calculated based on a learned value. For example, in operation S1646_1 of FIG. 12, the learned value $\hat{Q}_n$ may be calculated according to Equation 2.

$$\hat{Q}_n = S_n(F_{n-1}, G_{n-1}) + \gamma \max_G \overline{Q}_{n-1}(F_n, G) \qquad \text{[Equation 2]}$$

Furthermore, in operation S1646_2 of FIG. 12, $\hat{Q}_n$, which is a Q-value, may be calculated according to Equation 3.

$$\overline{Q}_n(F_{n-1},G_{n-1})=(1+\alpha_n)\overline{Q}_{n-1}(F_{n-1},G_{n-1})+\alpha_n\hat{Q}_n \qquad \text{[Equation 3]}$$

In Equation 3, $\alpha_n$ denotes a learning rate between 0 and 1, and may be calculated according to Equation 4.

$$\alpha_n = \frac{A_n}{N_n(F_{n-1}, G_{n-1}) + A_n} \qquad \text{[Equation 4]}$$

Therefore, the learning data 30 including a Q-value may be updated. The learning data 30 may include a plurality of Q-values and at least one of the Q-values may be updated by one repetition. The learning data 30 including the updated Q-value may be provided as feedback to operation S1646, and may be used for learning a control method for the next iteration.

In operation S1662, an operation of determining whether to use the learned control may be performed. For example, the background operation scheduler 110a may determine, based on the Q-values included in the learning data 30 and threshold values set in advance, whether to use the learned control. Alternatively, the background operation scheduler 110a may monitor changes in environment variables according to an operating state of the system 1a, and may determine not to use the learned control when values of the environment variables are outside of a range of previously defined values.

In operation S1664, an operation of determining control using the learned control may be performed. Referring to FIG. 13, learning data 30' may include a plurality of Q-values written to a table comprised of rows of F combinations of the operating parameters and columns of G timings of the background operation. In the table, the background operation scheduler 110a may determine background operation timing from the labels corresponding to a row having the maximum value of the Q-values of rows corresponding to F. In other words, $G_n^*$, the background operation timing, may be calculated according to Equation 5.

$$G_n^* = \operatorname*{argmax}_G \overline{Q}_n(F_n, G) \qquad \text{[Equation 5]}$$

Following operation S1664, the method according to the present exemplary embodiment may proceed to operation S1800 of FIG. 5.

Figure 14:
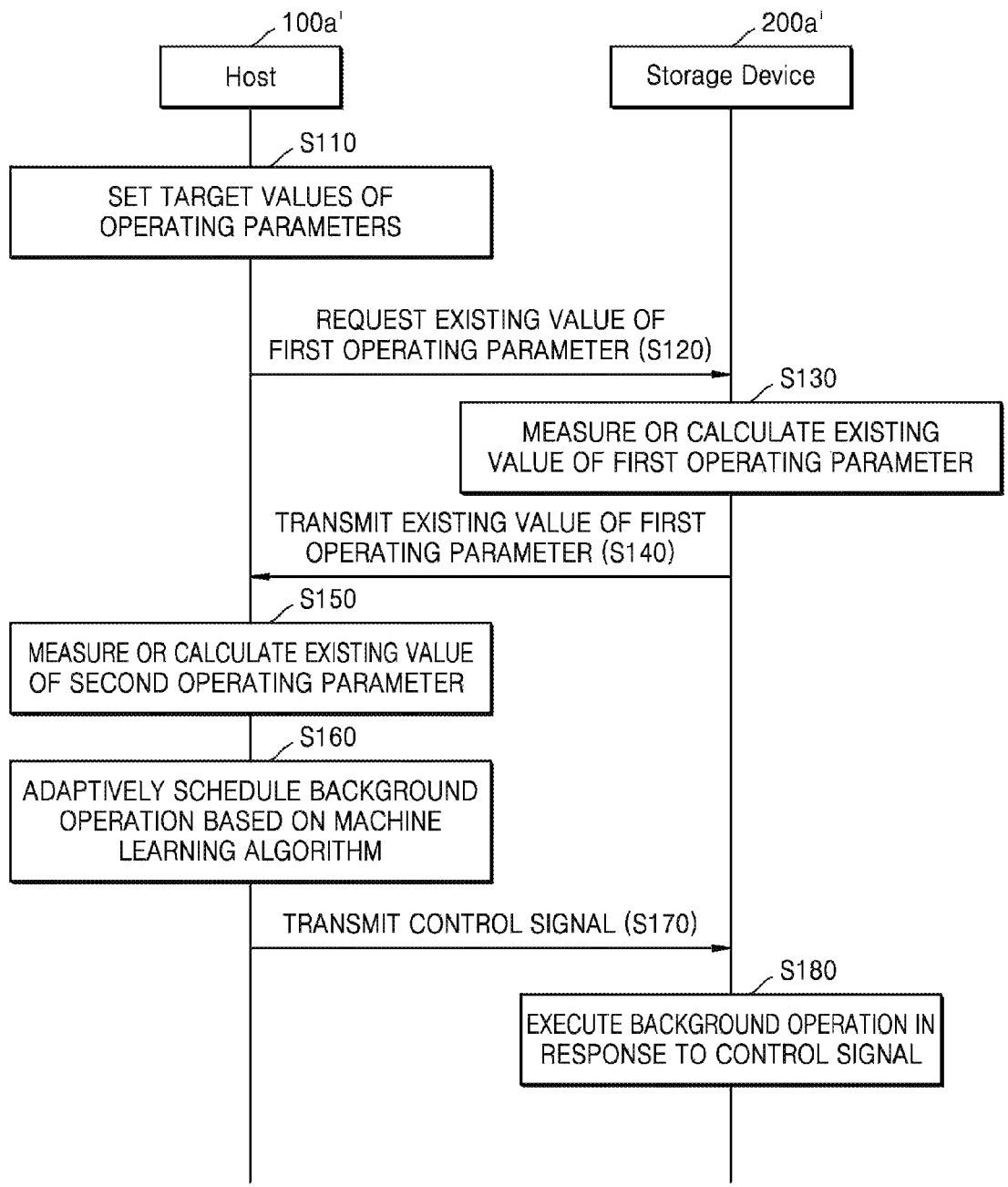
FIG. 14 illustrates operations performed by a host and a storage device according to a method of managing the storage device over time, according to an exemplary embodiment.

FIG. 14 illustrates operations performed by a host and a storage device according to a method of managing the storage device over time, according to an exemplary embodiment. Referring to FIG. 14, a host 100a' (for example, the background operation scheduler 110a of FIG. 3) may set target values for operating parameters (S110). The host 100a' may extract the target values of the operating parameter by target performance received from a user or an application program, or may set the target values of the operating parameter to a default value or existing values.

The host 100a' may request an existing value of the first operating parameter (S120). The first operating parameter, which is an operating parameter included in the first operating parameter set P1 of FIG. 4, may be measured or calculated based on a state of a storage device 200a'. The storage device 200a' (for example, the controller 220a of FIG. 3 or the background operation executor 221a) may measure or calculate the existing value of the first operating parameter in response to a request from the host 100a' (S130), and may transmit the existing value of the first operating parameter to the host 100a' (S140).

The host 100a' may measure or calculate an existing value of a second operating parameter (S150). The second operating parameter, which is an operating parameter included in the second operating parameter set P2 of FIG. 4, may be measured or calculated based on a state of the host 100a'. Next, the host 100a' may adaptively schedule a background operation based on a machine learning algorithm (S160). For example, the host 100a' may calculate a performance score based on the target values and existing values of the operating parameters, and may determine background operation timing based on the performance score and accumulated data.

The host 100a' may transmit a control signal to the storage device 200a' based on a background operation schedule (S170). The control signal may include a code representing a type of the background operation, and a start time and duration of the background operation. The storage device 200a' may execute the background operation in response to the control signal received from the host (S180). For example, the storage device 200a' may start and finish a garbage collection operation based on information included in the control signal.

Figure 15:
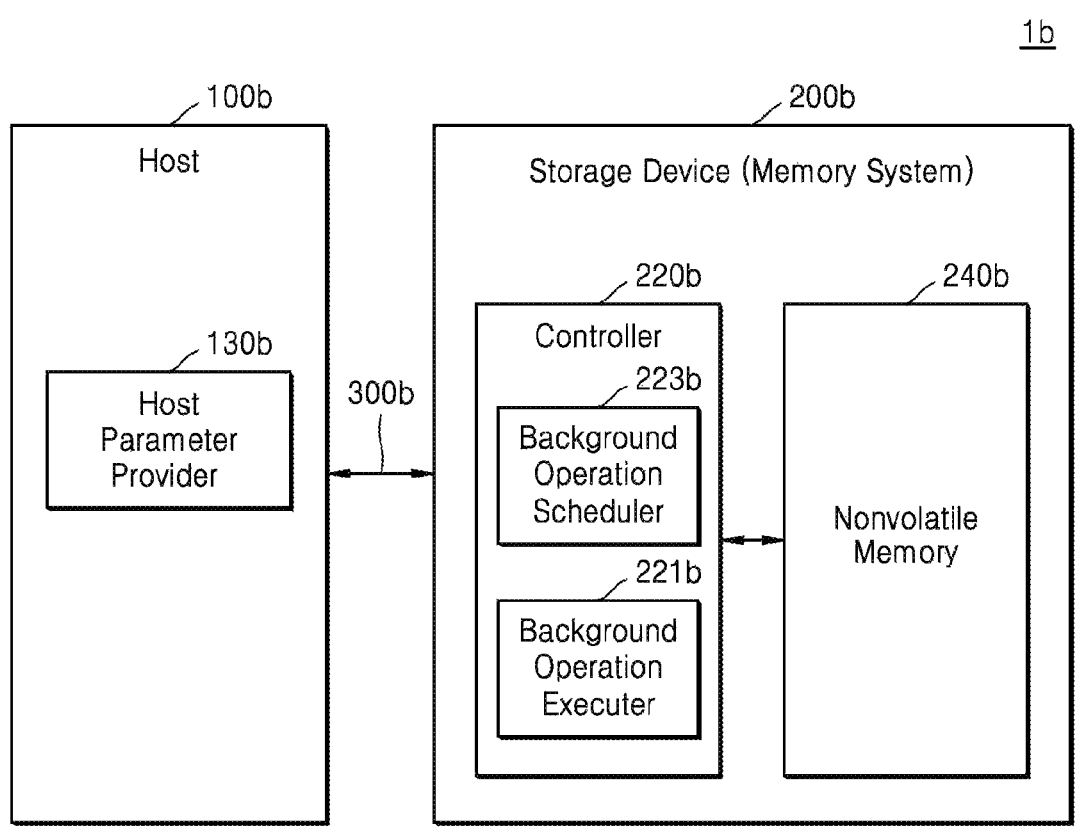
FIG. 15 is a block diagram of a system, according to an exemplary embodiment.

FIG. 15 is a block diagram of a system, according to an exemplary embodiment. The system 1b may include a host 100b and a storage device 200b, and the host 100b and the storage device 200b may communicate with each other through a communication channel 300b.

Compared to the system 1a of FIG. 3, in the system 1b of FIG. 15, scheduling of a background operation of the storage device 200b may be performed by a background operation scheduler 223b included in a controller 220b of the storage device 200b. That is, similar to the background operation scheduler 110a of FIG. 3, the background operation scheduler 223b of FIG. 15 may schedule the background operation by using a machine learning algorithm based on target values and existing values of operating parameters.

Referring to FIG. 15, the host 100b may include a host parameter provider 130b. For example, the host parameter provider 130b may receive target performance, and may extract the target values of the operating parameters or generate values of the operating parameters from the target performance, similar to the background operation scheduler 110a of FIG. 3. Furthermore, the host parameter provider 130b may measure or calculate existing values of the operating parameters included in the second operating parameter set P2. Referring to FIG. 1, the host parameter provider 130b may be realized as, for example, the processor 120 and the host memory 140.

The host parameter provider 130b may transmit the target values of the operating parameters and the existing values of the operating parameters included in the second operating parameter set P2 to the storage device 200b through the communication channel 300b. In other words, the host parameter provider 130b may provide the storage device 200b (or the background operation scheduler 223b) with the values of the operating parameters so that the background operation scheduler 223b of the storage device 200b may schedule the background operation by using the machine learning algorithm.

Referring to FIG. 15, the storage device 200b may include the controller 220b and a nonvolatile memory 240b. The controller 220b may include a background operation executor 221b and the background operation scheduler 223b. The background operation executor 221b may execute a background operation, for example, a garbage collection operation based on a signal provided by the background operation scheduler 223b. Referring to FIG. 1, the background operation scheduler 223b and the background operation executor 221b may be respectively realized as, for example, the processor 222 and the controller memory 224. Hereinafter, a detailed description with respect to a method of operating the storage device 200b by the controller 220b (or the background operation scheduler 223b) will be described.

Figure 16:
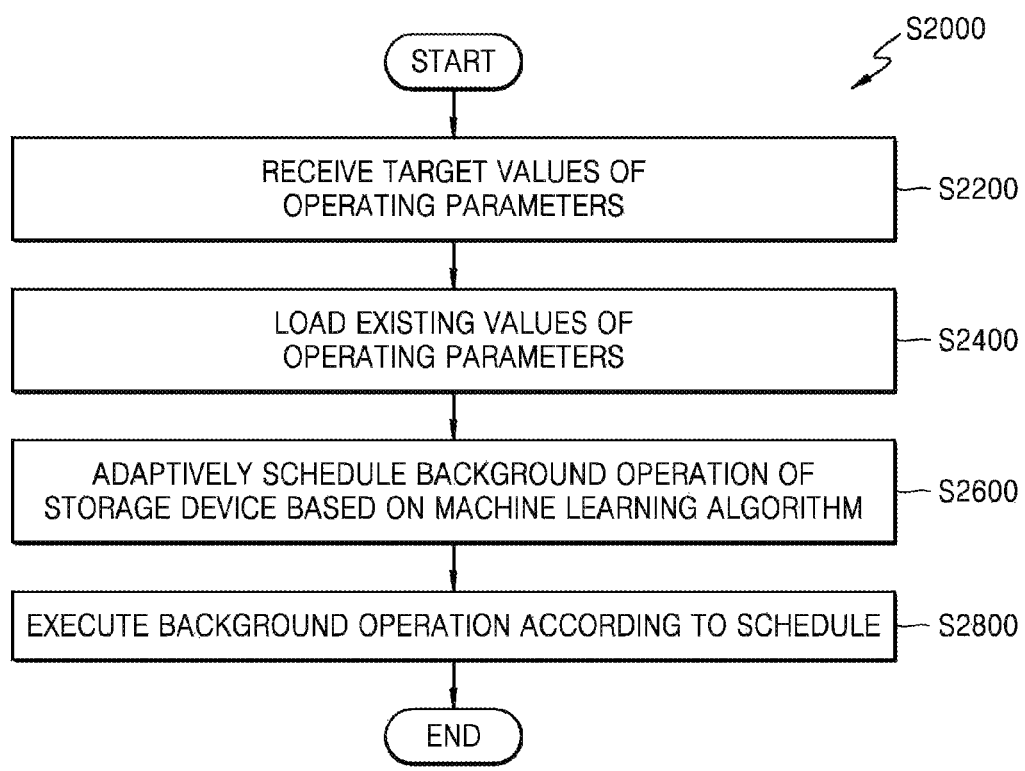
FIG. 16 is a flowchart illustrating a method of operating a storage device, according to an exemplary embodiment.

FIG. 16 is a flowchart illustrating an operating a storage device, according to an exemplary embodiment. In detail, FIG. 16 illustrates an exemplary embodiment of the operating method S2000 of the storage device by a controller of the storage device, and the operating method S2000 of FIG. 16 may be performed by, for example, the background operation scheduler 223b and the background operation executor 221b of FIG. 15. Hereinafter, FIG. 16 will be described with reference to FIG. 15. Referring to FIG. 16, the operating method S2000 of the storage device 200b may include a plurality of operations S2200, S2400, S2600, and S2800.

In operation S2200, an operation of receiving target values of operating parameters may be performed. For example, the host parameter provider 130b of the host 100b may transmit the target values of the operating parameters to the storage device 200b through the communication channel 300b, and the background operation scheduler 223b may receive the target values of the operating parameters.

In operation S2400, an operation of loading existing values of the operating parameters may be performed. For example, the background operation scheduler 223b may directly measure or calculate existing values of some of the operating parameters, or may receive existing values of some of the operating parameters from the host 100b. A detailed description of operation S2400 will be described below with reference to FIG. 17.

In operation S2600, an operation of adaptively scheduling a background operation of a storage device based on a machine learning algorithm may be performed. For example, the background operation scheduler 223b, as described above with reference to FIGS. 9 to 13, may schedule a background operation by using the machine learning algorithm based on the target values and existing values of the operating parameters.

In operation S2800, an operation of executing a background operation according to a schedule may be performed. For example, the background operation scheduler 223b may transmit a signal to the background operation executor 221b based on a determined background operation timing, and the background operation executor 221b may perform a background operation, for example, a garbage collection operation based on the received signal.

Figure 17:
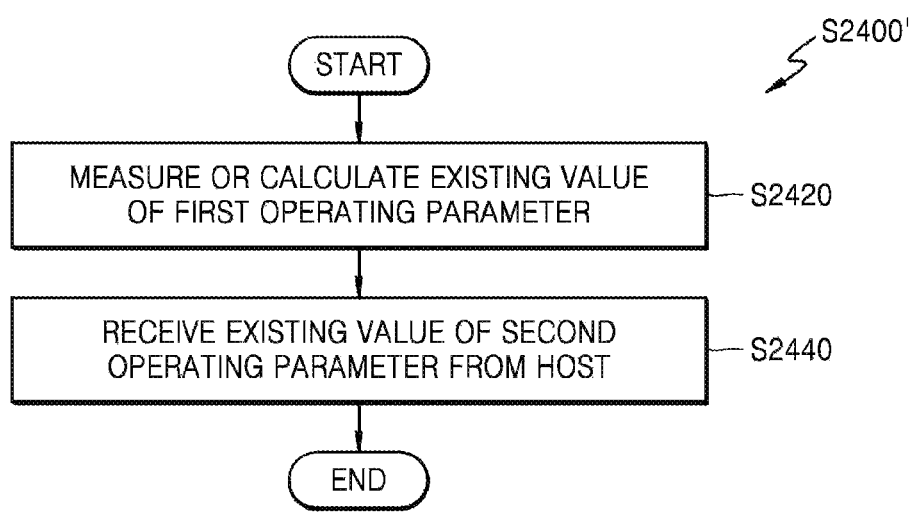
FIG. 17 is a flowchart illustrating a method of operating a storage device, according to an exemplary embodiment.

FIG. 17 is a flowchart illustrating a method of managing a storage device, according to an exemplary embodiment. As described above with reference to FIG. 16, in operation S2400, the operation of loading the existing values of the operating parameters may be performed. In exemplary embodiments of FIGS. 15 and 16, because the background operation is scheduled by the background operation scheduler 223b of the storage device 200b, the background operation scheduler 223b may collect the existing values of the operating parameters.

In operation S2420, an operation of measuring or calculating an existing value of a first operating parameter by the background operation scheduler 223b may be performed. Next, in operation S2440, an operation of receiving an existing value of a second operating parameter from the host 100b by the background operation scheduler 223b may be performed. Therefore, the background operation scheduler 223b may load the existing values of the operating parameters.

Figure 18:
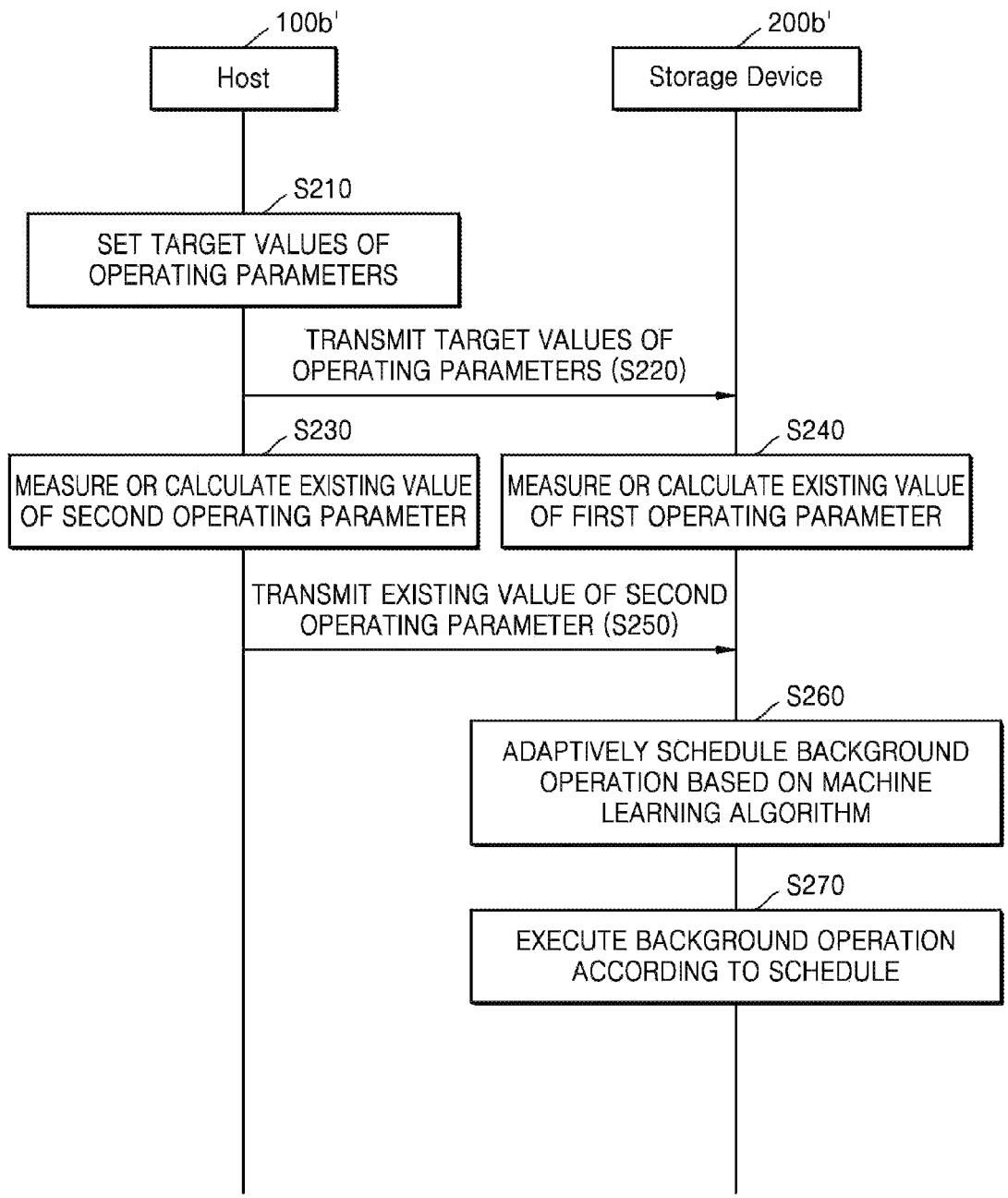
FIG. 18 illustrates operations performed by a host and a storage device according to a method of operating the storage device over time, according to an exemplary embodiment.

FIG. 18 illustrates operations performed by a host and a storage device according to a method of operating the storage device over time, according to an exemplary embodiment.

Referring to FIG. 18, a host 100b' (for example, the host parameter provider 130b of FIG. 15) may set target values for operating parameters (S210). The host 100b' may extract the target values of the operating parameters from target performance received from a user or an application program, and may also set the target values of the operating parameters to a default value or existing values. Next, the host 100b' may transmit the target values of the operating parameters to a storage device 200b' (S220). The target values of the operating parameters may be used for scheduling a background operation through machine learning in the storage device 200b'.

The host 100b' may measure or calculate an existing value of a second operating parameter (S230), and the storage device 200b' may measure or calculate an existing value of a first operating parameter (S240). The storage device 200b' may measure or calculate the existing value of the first operating parameter in response to the target values of the operating parameters received from the host 100b' or a request from the host 100b'.

The host 100b' may transmit the existing value of the second operating parameter set to the storage device 200b' (S250). Next, the storage device 200b' may adaptively schedule a background operation based on a machine learning algorithm (S260). In other words, the storage device 200b' (for example, the background operation scheduler 223b of FIG. 15) may schedule the background operation by using the machine learning algorithm based on the target values of the operating parameter, and the existing values of the first and second operating parameters. The storage device 200b' (for example, the background operation executor 221b) may execute the background operation according to the schedule (S270).

Figure 19:
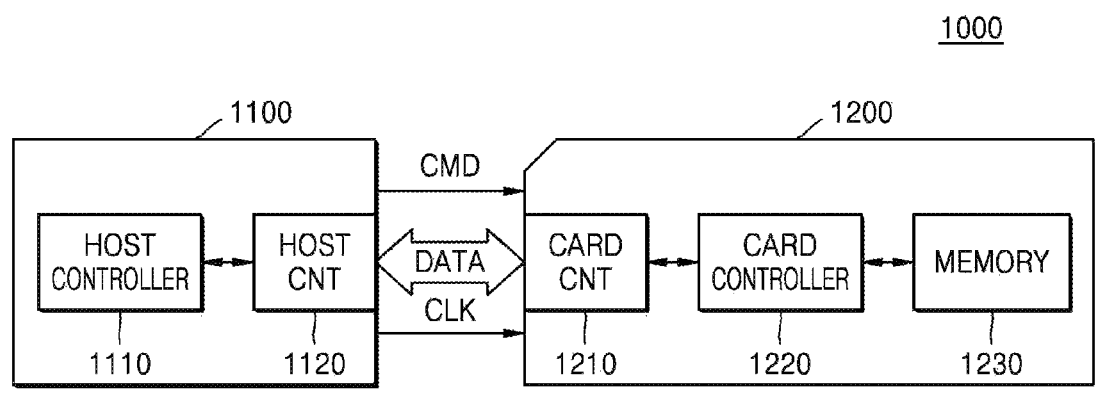
FIG. 19 is a block diagram of a memory card system according to exemplary embodiments.

FIG. 19 is a block diagram of a memory card system 1000 according to various exemplary embodiments.

Referring to FIG. 19, the memory card system 1000 may include a host 1100 and a memory card 1200. The host 1100 may include a host controller 1110 and a host connector 1120. The memory card 1200 may include a card connector 1210, a card controller 1220, and a memory device 1230. According to exemplary embodiments described above, the memory card 1200 may be managed by the host 1100 and the memory card 1200 may be operated by the card controller 1220.

The host 1100 may write/read data in/from the memory card 1200. The host controller 1110 may transmit a command CMD, a clock signal CLK generated from a clock generator in the host 1100, and data DATA to the memory card 1200 via a host connector 1120.

The card controller 1220 may respond to a command received via the card connector 1210 and store data in the memory device 1230 by being synchronized with a clock signal generated from a clock generator in the card controller 1220. The memory device 1230 may store data received from the host 1100.

The memory card 1200 may be realized as a compact flash card (CFC), a Microdrive, a smart media card (SMC), a multimedia card (MMC), a security digital card (SDC), a memory stick, a USB flash memory driver, or other non-volatile memory device.

Figure 20:
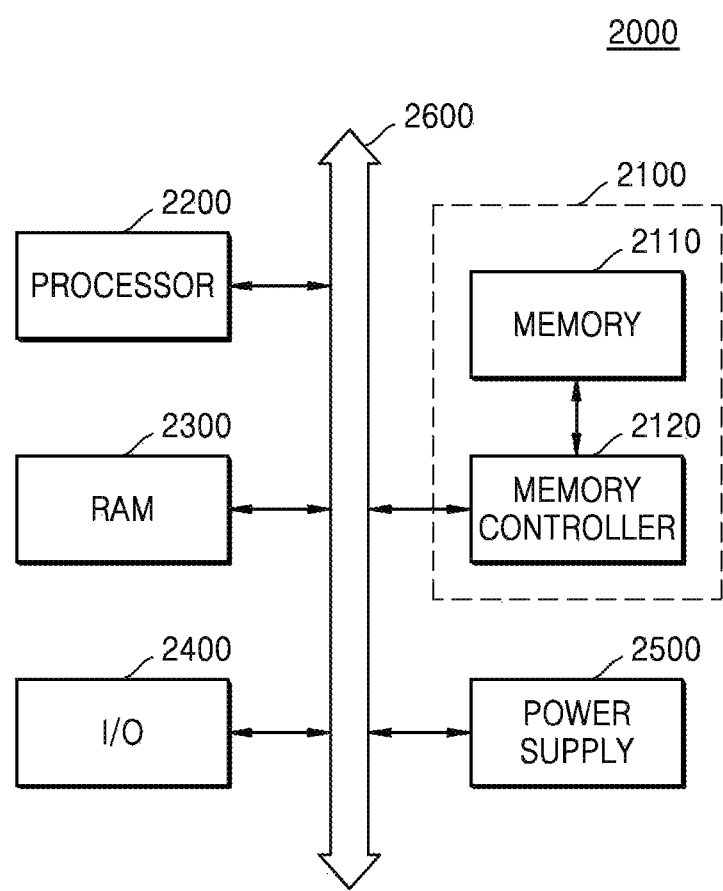
FIG. 20 is a block diagram of a computing system according to one or more exemplary embodiments.

FIG. 20 is a block diagram of a computing system 2000 according to various exemplary embodiments.

Referring to FIG. 20, the computing system 2000 may include a memory system 2100, a processor 2200, RAM 2300, an input/output device 2400, and a power supply 2500. The computing system 2000 may further include ports capable of communicating with a video card, a sound card, a memory card, and a USB device, or other electronic devices. The computing system 2000 may be realized as a PC, or a portable electronic device such as a laptop computer, a mobile phone, a PDA, or a camera.

The processor 2200 may perform calculations or tasks. According to an exemplary embodiment, the processor 2200 may be a microprocessor or a central processing unit (CPU).

The processor 2200 may communicate with the RAM 2300, the input/output device 2400, and the memory system 2100 through a bus 2600 such as an address bus, a control bus, or a data bus. According to an exemplary embodiment, the processor 2200 may be connected to an extension bus such as a peripheral component interconnect (PCI) bus. According to exemplary embodiments described above, the memory system 2100 may include memory 2110, be managed by the processor 2200 and operated by a memory controller 2120.

The RAM 2300 may store data for an operation of the computing system 2000. For example, the RAM 2300 may be realized as dynamic random access memory (DRAM), mobile DRAM, static RAM (SRAM), PRAM, ferroelectrics RAM (FRAM), RRAM and/or MRAM. The input/output device 2400 may include an input interface, such as a keyboard, a keypad, or a mouse, and an output interface, such as a printer or a display. The power supply 2500 may supply an operating voltage for the computing system 2000.

Figure 21:
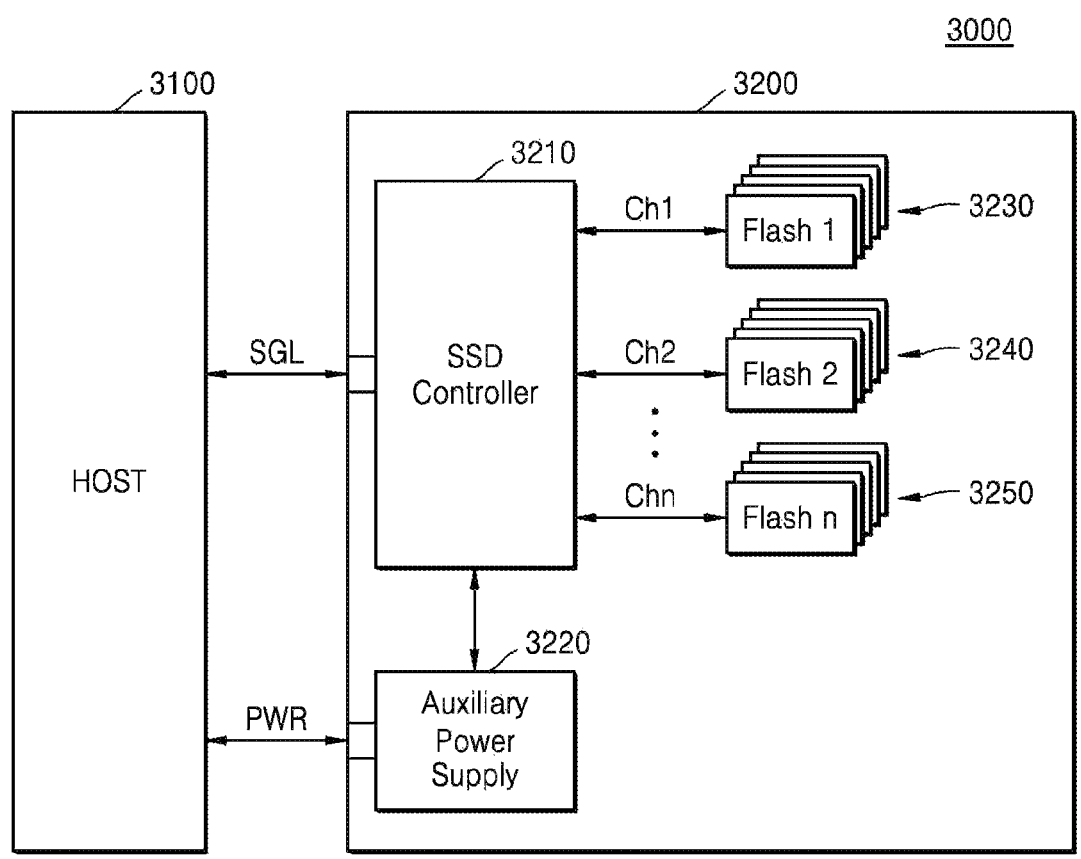
FIG. 21 is a block diagram of a system including an SSD (solid state drive or solid disk device), according to one or more exemplary embodiments.

FIG. 21 is a block diagram of a system 3000 including an SSD (solid state drive or solid disk device) 3200, according to various exemplary embodiments. Referring to FIG. 21, the system 3000 may include a host 3100 and the SSD 3200. The SSD 3200 exchanges a signal with the host 3100 through a signal connector, and receives power through a power connector. The SSD 3200 may include an SSD controller 3210, an auxiliary power supply 3220, and a plurality of memory devices 3230, 3240, and 3250 connected to the SSD controller 3210 via channels Ch1 through Chn. According to exemplary embodiments described above, the SSD 3200 may be managed by the host 3100 and operated by the SSD controller 3210.

While the inventive concept has been particularly shown and described with reference to exemplary embodiments thereof, it will be understood that various changes in form and details may be made therein without departing from the spirit and scope of the following claims.

What is claimed is:

1. A method of managing a storage device by a host in communication with the storage device, the method comprising:

setting, by the host, a first target value and a second target value of a plurality of target values respectively corresponding to a first operating parameter and a second operating parameter of a plurality of operating parameters of the storage device;

loading, by the host, a first existing value and a second existing value of a plurality of existing values of the first operating parameter and the second operating parameter;

processing, by the host, a machine learning algorithm using the first target value, the second target value, the first existing value and the second existing value to generate an adaptive schedule;

adaptively scheduling, by the host, a background operation of the storage device based on the adaptive schedule as generated;

generating, by the host, a control signal to control the storage device to execute the background operation based on the adaptive scheduling of the background operation; and transmitting, by the host, the control signal to the storage device.

2. The method of claim 1, wherein the setting of the first target value and the second target value for the plurality of operating parameters comprises generating the first target value based on one among an operation that is being performed, a scheduled operation that is to be performed in the host, and a prescribed reference value.

3. The method of claim 1, wherein
the first operating parameter corresponds to a state of the storage device, and
the loading of the first existing value comprises receiving the first operating parameter from the storage device.

4. The method of claim 1, wherein
the second operating parameter corresponds to a state of the host, and
the loading of the second existing value comprises measuring or calculating the second operating parameter.

5. The method of claim 1, wherein
the machine learning algorithm is a Q-learning algorithm, the method further comprises:
calculating, by the host, a performance score proportional to an absolute value of a difference between the first target value and the second target value, and the plurality of existing values using the Q-learning algorithm; and
determining, by the host, a timing label corresponding to a row comprising a highest Q value in a table comprised of rows of combinations of the plurality of operating parameters and columns of timing information of the background operation, and
the adaptive scheduling of the background operation is based on the timing label as determined.

6. The method of claim 1, wherein
the storage device comprises a flash memory device, and
the background operation is a garbage collection operation corresponding to the flash memory device.

7. The method of claim 1, wherein the machine learning algorithm is processed using the first target value, the second target value, the first existing value, the second existing value, a first weight of the first operating parameter and a second weight of the second operating parameter.

8. A method of operating a storage device in communication with a host, the method comprising:
receiving, by the storage device, a first target value and a second target value of a plurality of target values respectively corresponding to a first operating parameter and a second operating parameter of a plurality of operating parameters of the storage device from the host;
loading, by the storage device, a first existing value and a second existing value of a plurality of existing values of the first operating parameter and the second operating parameter;
processing, by the storage device, a machine learning algorithm using the first target value, the second target value, the first existing value and the second existing value to generate an adaptive schedule;
adaptively scheduling, by the storage device, a background operation of the storage device based on the adaptive schedule as generated; and
executing, by the storage device, the background operation based on the adaptive scheduling of the background operation.

9. The method of claim 8, wherein
the first operating parameter corresponds to a state of the storage device, and
the loading the first existing value and the second existing value comprises measuring or calculating the state of the storage device.

10. The method of claim 9, wherein
the first operating parameter comprises at least one among a number of free blocks of the storage device, a wear level index, a temperature, a rate of internal operation, and an error correction time.

11. The method of claim 8, wherein
the second operating parameter corresponds to a state of the host, and
the loading the first existing value and the second existing value comprises receiving the second operating parameter from the host.

12. The method of claim 11, wherein
the second operating parameter comprises at least one among an input/output throughput, an input/output latency, a load index, an estimated idle time, and an estimated input/output usage.

13. The method of claim 8, wherein
the machine learning algorithm is a Q-learning algorithm.

14. The method of claim 13, further comprising:
calculating, by the storage device, a performance score proportional to an absolute value of a difference between the first target value and the second target value, and the plurality of existing values using the Q-learning algorithm; and
determining, by the storage device, a timing label corresponding to a row comprising a highest Q value in a table comprised of rows of combinations of the plurality of operating parameters and columns of timing information of the background operation,
wherein the adaptive scheduling of the background operation is based on the timing label as determined.

15. The method of claim 8, wherein
the storage device comprises a flash memory device, and
the background operation is a garbage collection operation corresponding to the flash memory device.

16. The method of claim 8, wherein the machine learning algorithm is processed using the first target value, the second target value, the first existing value, the second existing value, a first weight of the first operating parameter and a second weight of the second operating parameter.

17. The method of claim 1, wherein the setting the first target value comprises:
receiving, by the host, target performance information corresponding to an operation of the storage device; and
extracting, by the host, the first target value of the first operating parameter from the target performance information.

18. A storage device comprising:
a nonvolatile memory; and
a controller configured to:
receive a first target value and a second target value of a plurality of target values respectively corresponding to a first operating parameter and a second operating parameter of a plurality of operating parameters of the storage device from a host;
load a first existing value and a second existing value of a plurality of existing values of the first operating parameter and the second operating parameter;
adaptively schedule a background operation of the nonvolatile memory based on the first target value, the second target value, the first existing value and the second existing value; and
execute the background operation of the nonvolatile memory based on the adaptive scheduling of the background operation.

19. The storage device of claim 18, wherein
the first operating parameter corresponds to a storage device state, and
the second operating parameter corresponds to a host state.

20. The storage device of claim 18, wherein the adaptive scheduling is based on a machine learning algorithm processed using the first target value, the second target value, the first existing value, the second existing value, a first weight of the first operating parameter and a second weight of the second operating parameter.

* * * * *